(No Model.)

E. MAYNZ.
RIVET.

No. 247,088.        Patented Sept. 13, 1881.

WITNESSES
Frank G. Parker
A. J. Oettinger

INVENTOR
Edward Maynz.
by his attys
Clarke & Raymond

UNITED STATES PATENT OFFICE.

EDWARD MAYNZ, OF BOSTON, MASSACHUSETTS.

RIVET.

SPECIFICATION forming part of Letters Patent No. 247,088, dated September 13, 1881.

Application filed July 6, 1880. (No model.)

*To all whom it may concern:*

Be it known that I, EDWARD MAYNZ, of Boston, in the county of Suffolk and Commonwealth of Massachusetts, have invented an Improvement in Rivets, of which the following is a specification.

This invention has for its object the following-described improvement in rivets, reference being made to the accompanying drawings, forming a part of this specification, in explaining its nature, in which—

Figure 1:
Figure 4:
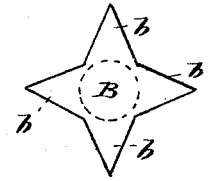
Figure 2:
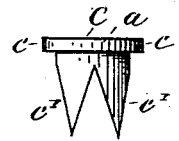
Figure 5:
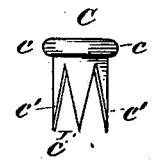
Figure 3:
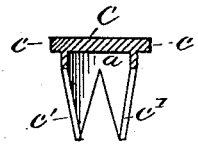

Figure 1 is a perspective of a blank. Fig. 2 is an elevation of a rivet made therefrom. Fig. 3 is a cross-section. Fig. 4 is a plan of a modified blank. Fig. 5 is an elevation of the rivet made therefrom, and Fig. 6 a cross-section thereof.

This invention is an improvement upon the "tubular rivets," so called; and it consists in providing the head of the rivet with fastening prongs or projections in lieu of the continuous tubular shank heretofore employed as the fastening medium.

In order to properly set tubular rivets it is necessary to puncture the material to which it is to be secured, and then insert the shank of the rivet, and to clinch the same by spreading its lower end, much as an eyelet is spread.

By providing a rivet with fastening-prongs instead of the tubular shank the rivet can be readily inserted without first puncturing the material, and the points can be easily clinched.

I am aware that tubular rivets are made and used which have the lower edge of the tubular shank sharpened, and which are used for puncturing holes; but in order to properly drive and clinch such rivets, especial mechanism of a complicated nature is necessary in addition to the extra cost which appertains to the shaping of the rivet in this manner, and the fact that the leather is punctured by it as it is by the ordinary tubular rivet; and this is an objection which it is desirable to overcome, and which I have succeeded in overcoming by the use of prongs which do not remove any portion of the stock in the insertion.

My improved rivet may be made by striking up a tubular rivet from a round blank of the proper size, much as a metallic cartridge is struck up, with the exception that the head should project slightly farther from the fastening portion of the rivet than the flange of the cartridge projects from the other part of the shell, and the machinery in making metallic cartridges can be employed in performing this step in the process of making the rivet. Portions of the tube are then removed, leaving two, three, or four prongs extending from the head downwardly, and sharpened at their ends and flattened somewhat, if desirable, for the fastening medium.

A represents the blank used, and *a* the rivet prepared from it, as above described.

Figure 6:
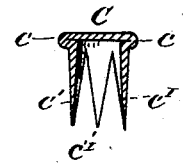

Another way of making the rivet is provided by shaping the blank B as shown in Fig. 4, and in then turning down the prongs *b*, and in then drawing in the upper portion of the prongs or bunting the head portion to enlarge the head of the rivet, so that the shape shown in Figs. 5 and 6 is obtained.

A rivet formed by either of these processes will have a head portion, C, the projecting flange *c*, and the fastening-prongs *c'*, curved in cross-section.

I am aware that the Patent No. 162,184, granted McGill, dated April 20, 1875, shows and describes a paper-fastener in two forms, one form consisting of a head portion and two long prongs extending from the center of said head portion, and the other consisting of a perforated head portion having two prongs separated from each other by the width of the perforation.

Having thus fully described my invention, I claim and desire to secure by Letters Patent of the United States—

As an improved article of manufacture, a rivet struck up from a blank, having the head C, the flange *c*, and the fastening-prongs *c'*, curved in cross-section, all substantially as set forth.

EDWD. MAYNZ.

Witnesses:
F. F. RAYMOND, 2d,
A. J. OETTINGER.